J. KEITH.
COMBINED PAPER WEIGHT AND FAN.
APPLICATION FILED MAY 15, 1909.
948,611.
Patented Feb. 8, 1910.
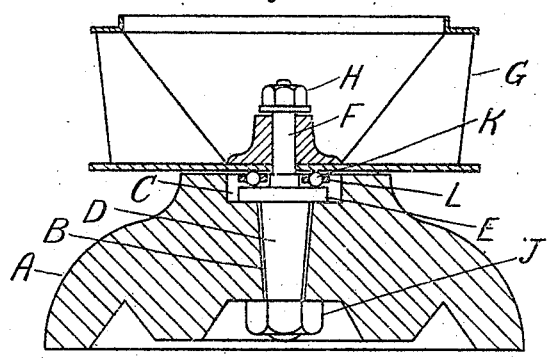
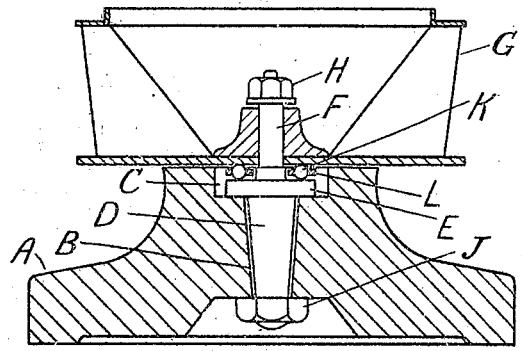
WITNESSES:
W. H. Berrigan
Alfred R. Anderson
INVENTOR,
JAMES KEITH,
by
Attorney.

UNITED STATES PATENT OFFICE.

JAMES KEITH, OF LONDON, ENGLAND.

COMBINED PAPER-WEIGHT AND FAN.

948,611.  Specification of Letters Patent.  Patented Feb. 8, 1910.

Application filed May 15, 1909. Serial No. 496,279.

*To all whom it may concern:*

Be it known that I, JAMES KEITH, a subject of the King of the United Kingdom of Great Britain and Ireland, and residing at London, England, have invented a certain new and useful Improvement in Combined Paper-Weights and Fans, of which the following is a specification.

The article of manufacture forming the subject of this invention is a combined paperweight and fan designed more especially as an advertising device.

As will be seen from the accompanying drawings of which Figures 1 and 2 illustrate two equivalent forms of the article in part elevation part vertical section, the said article comprises a comparatively heavy and easily-portable base element A, of glass, porcelain, or other suitable material, constructed to be used as a paperweight and formed with a central, vertical and tapered orifice B, counter-sunk at C, adapted to receive a vertical spindle D, tapered at its lower end corresponding to the form of said orifice B, and having a collar E resting on the counter-sunk part of the base element surrounding said orifice, a reduced part F of the said spindle D being extended upwardly and forming the axis of a fan wheel G, nuts H and J being secured to the ends of the spindle. The said collar E affords a ball race for balls K confined in a ring L, on which balls rests the center portion of the lower face of the fan wheel, thus constituting a ball bearing, so that the fan wheel may be readily set in rotation in a horizontal plane and may continue to rotate for a long time. Suitable lettering may, if desired, be applied to the base element.

The new article of manufacture is intended not only to demonstrate the construction and operation of a fan-wheel, but also to be used as an advertising device and as a paper-weight which is readily shifted from one part to another of a desk and from one desk to another. The article is useful for any one of the mentioned purposes and for two or all thereof.

Having now described my invention what I claim and desire to secure by Letters Patent of the United States is:—

The herein described article of manufacture easily portable from place to place and comprising a comparatively heavy base element constructed and useful as a paperweight and formed with a central, vertical, tapered orifice, a tapered vertical spindle fitted within said orifice, and having a collar, a fan wheel carried by said spindle and rotatable in a horizontal plane, and ball bearings interposed between said collar and the base of said fan-wheel.

In testimony whereof I have signed my hand to this specification in the presence of two subscribing witnesses.

JAMES KEITH.

Witnesses:
  WALLACE CRANSTON FAIRWEATHER,
  JOHN MCCLEARY.